US009054557B2

(12) United States Patent
Juhlin

(10) Patent No.: US 9,054,557 B2
(45) Date of Patent: Jun. 9, 2015

(54) VOLTAGE BALANCING OF SYMMETRIC HVDC MONOPOLE TRANSMISSION LINES AFTER EARTH FAULTS

(75) Inventor: Lars-Erik Juhlin, Ludvika (SE)

(73) Assignee: ABB Technology AG, Zürich (CH)

( * ) Notice: Subject to any disclaimer, the term of this patent is extended or adjusted under 35 U.S.C. 154(b) by 0 days.

(21) Appl. No.: 13/881,771

(22) PCT Filed: Oct. 29, 2010

(86) PCT No.: PCT/EP2010/066538
§ 371 (c)(1),
(2), (4) Date: May 22, 2013

(87) PCT Pub. No.: WO2012/055447
PCT Pub. Date: May 3, 2012

(65) Prior Publication Data
US 2013/0229739 A1 Sep. 5, 2013

(51) Int. Cl.
*H02H 3/22* (2006.01)
*H02J 3/36* (2006.01)
*H02H 9/04* (2006.01)
*H02M 1/32* (2007.01)

(52) U.S. Cl.
CPC .. *H02J 3/36* (2013.01); *H02H 9/04* (2013.01); *H02M 1/32* (2013.01); *Y02E 60/60* (2013.01)

(58) Field of Classification Search
CPC ....................................................... H02H 9/04
USPC ................................................ 361/91.1, 111
See application file for complete search history.

(56) References Cited

U.S. PATENT DOCUMENTS 5,870,293 A * 2/1999 Svensson et al. ............... 363/37
8,643,995 B2 * 2/2014 Nunes et al. .................. 361/111

FOREIGN PATENT DOCUMENTS

WO WO 84/02807 A1 7/1984
WO WO 2009/149744 A1 12/2009

OTHER PUBLICATIONS

Asplund et al., "DC Transmission Based on Voltage Source Converters", CIGRE SC14 Colloquium, Dec. 31, 1997, pp. 1-10.
(Continued)

*Primary Examiner* — Thienvu Tran
*Assistant Examiner* — Tien Mai
(74) *Attorney, Agent, or Firm* — Birch, Stewart, Kolasch & Birch, LLP

(57) ABSTRACT

A voltage balancing unit for a symmetric monopole high voltage direct current (HVDC) transmission line interconnecting two voltage source converters (VSCs), the transmission line including first arresters having a first switching impulse protective level (SIPL) is provided. The voltage balancing unit includes a pair of second arresters having a second SIPL which is less than the first SIPL, and a switching device being arranged for temporarily connecting, in the event of a voltage unbalance on the transmission line, the first arresters between either pole and ground. A voltage unbalance on the transmission line may be removed by temporarily connecting second arresters, with a significantly lower SIPL than the first arresters, for limiting the pole voltage to a level close to the normal voltage. Further, a method of voltage balancing is provided. Voltage unbalances may arise as a consequence of lightning induced earth faults.

16 Claims, 5 Drawing Sheets

300

(56) References Cited

OTHER PUBLICATIONS

Elahi et al., "Insulation Coordination Process for HVDC Converter Stations: Preliminary and Final Designs", IEEE Transactions on Power Delivery, Apr. 4, 1989, No. 2, New York, US, pp. 1037-1048.

Schettler et al., "HVDC Transmission Systems using Voltage Sourced Converters—Design and Applications", Power Engineering Society Summer Meeting, Jul. 16-20, 2000, Piscataway, NJ, USA, vol. 2, pp. 715-720.

Yang et al., "Characteristics and Recovery Performance of VSC-HVDC DC Transmission Line Fault", Power and Energy Engineering Conference (APPEEC), Mar. 28-31, 2010, IEEE Piscataway, NJ, USA, pp. 1-4.

* cited by examiner

VOLTAGE BALANCING OF SYMMETRIC HVDC MONOPOLE TRANSMISSION LINES AFTER EARTH FAULTS

FIELD OF THE INVENTION

The invention relates in general to high voltage direct current (HVDC) power transmission, and more specifically to voltage balancing in the event of temporary earths faults in symmetric monopole HVDC power transmission networks.

BACKGROUND OF THE INVENTION

HVDC power transmission is becoming increasingly important due to the steadily rising need for bulk power delivery and interconnected power transmission and distribution systems. An HVDC grid typically comprises multiple terminals for converting an alternating current (AC) power source, using, e.g., voltage source converters (VSCs), for transmission over HVDC transmission lines. Within the grid, a terminal may be connected to multiple terminals resulting in different types of topologies. Such a multiple terminal grid enables efficient congestion management and has an improved stability against disturbances.

Typically, transmission lines which are solely based on cables suffer mostly from permanent line faults, whereas transmission lines comprising overhead lines may suffer both from permanent and temporary line faults. In particular, temporary faults due to lightning are much more frequent than permanent line faults, making a restart, after the fault is cleared, desirable.

In the case of symmetric monopole transmission lines, comprising two poles, a voltage unbalance may occur in the event of an earth fault on one of the poles. In order to facilitate automatic restarts in the event of temporary earths faults, it is desirable to remove the voltage unbalance. The voltage unbalance may, e.g., be removed utilizing discharge resistors in combination with DC choppers.

SUMMARY OF THE INVENTION

It is an object of the present invention to provide a more efficient alternative to the above techniques and prior art.

More specifically, it is an object of the present invention to provide an improved handling of voltage unbalances in symmetric monopole high voltage direct current (HVDC) transmission lines.

These and other objects of the present invention are achieved by means of a voltage balancing unit having the features defined in independent claim 1, and by means of a method of voltage balancing defined in independent claim 9. Embodiments of the invention are characterized by the dependent claims.

For the purpose of describing the invention, a per-unit (p.u.) system is adopted which allows to express system quantities as fractions of a defined base unit quantity. In the remainder, it is assumed that the base pole-to-earth voltage of the HVDC network is unity, i.e., equal to 1.0 p.u. Correspondingly, the base pole-to-pole voltage is equal to 2.0 p.u. The base voltage is also referred to as the normal voltage.

According to a first aspect of the invention, a voltage balancing unit for a symmetric monopole HVDC transmission line is provided. The transmission line is arranged for interconnecting a first voltage source converter (VSC) and a second VSC. The transmission line comprises a first pole, a second pole, and two pairs of first arresters. A first pair of first arresters is arranged at a first end of the transmission line. A second pair of first arresters is arranged at a second end of the transmission line. A first arrester of either pair is connected between the first pole and ground. A second arrester of either pair is connected between the second pole and ground. The first arresters have a first switching impulse protective level (SIPL). The voltage balancing unit comprises a pair of second arresters and switching means. The second arresters have a second SIPL. The second SIPL is less than the first SIPL. The switching means is arranged for connecting the second arresters in response to determining that a voltage unbalance between the first pole and the second pole exists. More specifically, the switching means is arranged for connecting a first arrester of the pair of second arresters between the first pole and ground, and a second arrester of the pair of second arresters between the second pole and ground. The switching means is further arranged for disconnecting the second arresters in response to determining that the voltage unbalance is cleared.

According to a second aspect of the invention, a method of voltage balancing in a symmetric monopole HVDC transmission line is provided. The transmission line is arranged for interconnecting a first VSC and a second VSC. The transmission line comprises a first pole, a second pole, and two pairs of first arresters. A first pair of first arresters is arranged at a first end of the transmission line. A second pair of first arresters is arranged at a second end of the transmission line. A first arrester of either pair is connected between the first pole and ground. A second arrester of either pair is connected between the second pole and ground. The first arresters have a first SIPL. The method comprises the steps of providing a pair of second arresters, connecting the second arresters in response to determining that a voltage unbalance between the first pole and the second pole exists, and disconnecting the second arresters in response to determining that the voltage unbalance is cleared. More specifically, the second arresters are connected by connecting a first arrester of the pair of second arresters between the first pole and ground, and a second arrester of the pair of second arresters between the second pole and ground. The second arresters have a second SIPL. The second SIPL is less than the first SIPL.

In the event of an earth fault on one of the poles in an HVDC power distribution network of symmetric monopoles, the voltage of the healthy pole will rise, since the normal voltage between the poles of the VSCs is equal to 2.0 p.u. The resulting overvoltage may be limited by first arresters designed to withstand the normal voltage during normal operation of the network, as well as the increased voltage during the fault. Nevertheless, the overvoltage constitutes a risk for an earth fault also on the healthy pole. Therefore, the voltage should be balanced before the power transmission network is restarted, after the fault is cleared. The present invention makes use of an understanding that a voltage unbalance on a symmetric monopole HVDC transmission line may be removed, i.e., the voltage on the two poles may be balanced, by temporarily connecting second arresters with a significantly lower SIPL than the first arresters, for limiting the pole voltage to a level close to the normal voltage. In order to avoid an overstress of the second arresters, the second arresters should preferably be connected after the fault is cleared. An embodiment of the invention is advantageous in that it is less expensive and faster than solutions based on discharge resistors and DC choppers.

According to an embodiment of the invention, the voltage unbalance is caused by an earth fault. An earth fault may, e.g., occur on either of the poles of the transmission line. Whereas transmission lines solely comprising underground cables mostly suffer from permanent faults caused by a breakdown of the solid cable insulation, temporary faults are prevalent on overhead lines having air as insulation medium. When the ionization after an arc disappears, the insulation capability of the air is restored and the fault thereby cleared. Temporary faults in overhead lines are frequently caused by lightning. Further, a voltage unbalance may also be caused by an earth fault on one of the phases of the VSCs. An embodiment of the invention is advantageous in that it facilitates automatic restarts of HVDC power transmission systems in case of temporary earth faults.

According to an embodiment of the invention, the pair of second arresters is arranged at either of the ends of the transmission line. For instance, the second arresters may be arranged at a terminal of a VSC, to which terminal the transmission line may be connected. This is advantageous in that the low surge impedance of the transmission line facilitates the disconnection of the second arresters after the fault is cleared. It will also be appreciated that two pairs of second arresters may be used, one pair being arranged at the first end of the transmission line and the other pair being arranged at the second end of the transmission line.

According to an embodiment of the invention, the first SIPL is in the range of 1.8 to 2.0 per unit, p.u., and the second SIPL is in the range of 1.15 to 1.20 p.u. It will be appreciated that the exact values of the first SIPL and the second SIPL depend on the particular specifications and requirements. According to the invention, the second SIPL should be significantly lower than the first SIPL and should have a value close to the base pole-to-earth voltage.

According to an embodiment of the invention, the switching means comprises a pair of high speed switches (HSSs) and a pair of disconnectors. A first HSS is connected in series with the first arrester of the pair of second arresters. A second HSS is connected in series with the second arrester of the pair of second arresters. The HSSs are in an open state under normal operation. A first disconnector is connected in series with the first arrester of the pair of second arresters. A second disconnector is connected in series with the second arrester of the pair of second arresters. The disconnectors are in a closed state under normal operation. The switching means is further arranged for closing the HSSs in response to determining that a voltage unbalance exists. The switching means is further arranged for, in response to determining that the voltage unbalance is cleared, opening the disconnectors, opening the HSSs, and closing the disconnectors. In order to avoid an overstress, it is preferable to connect the second arresters first after the fault is cleared, i.e., after the short-circuit between the faulty pole and ground has passed. However, in order to minimize the duration of the disturbance, the time between the clearance of the fault and the connection of the second arresters should not be too long, preferably in the range of 50 to 100 ms. An embodiment of the invention is advantageous in that it constitutes a switching arrangement which allows to quickly connect the second arresters after clearance of an earth fault and, subsequently, allows to disconnect the second arresters when the voltage on the poles is reduced to a value close to the normal voltage, even if the second arresters are loaded with current. As an alternative, the switching means may utilize HVDC circuit breakers.

According to an embodiment of the invention, an HVDC power transmission unit is provided. The power transmission unit comprises a first VSC, a symmetric monopole transmission line, and a voltage balancing unit. The first VSC comprises an alternating current (AC) side and a DC side. The AC side of the first VSC is connectable to a first AC network. The transmission line is arranged for interconnecting the DC side of the first VSC with a DC side of a second VSC. An AC side of the second VSC is connectable to a second AC network. The transmission line comprises a first pole and a second pole. Providing an HVDC power transmission unit with a voltage balancing unit according to an embodiment of the invention is advantageous since it facilitates automatic restarts after temporary earth faults by way of removing voltage unbalances on the transmission line, as was described above.

According to an embodiment of the invention, the power transmission unit further comprises an AC circuit breaker. The AC circuit breaker is arranged for disconnecting the first VSC from the first AC network in response to determining that a voltage unbalance exists. The AC circuit breaker is further arranged for reconnecting the first VSC to the first AC network in response to determining that the voltage unbalance is cleared. Preferably, the first VSC is reconnected to the first AC network in response to determining that the voltage unbalance is cleared and/or the earth fault is cleared. An embodiment of the invention allows to disconnect an AC network feeding the fault. This is advantageous if VSCs are used, since the converter cannot extinguish the current and the diode bridge of the converter will feed current into the fault. Preferably, the AC network feeding the fault should be disconnected before the second arresters are connected. It will also be appreciated that a second AC circuit breaker may be utilized, which second AC circuit breaker is arranged for disconnecting, in response to determining that a voltage unbalance exists, the second VSC from the second AC network and reconnecting, in response to determining that the voltage unbalance is cleared and/or the earth fault is cleared, the second VSC to the second AC network.

According to an embodiment of the invention, the power transmission unit further comprises a pair of DC circuit breakers. The DC circuit breakers are arranged for disconnecting the transmission line from the first VSC in response to determining that a voltage unbalance exists. The DC circuit breakers are further arranged for reconnecting the transmission line to the first VSC in response to determining that the voltage unbalance is cleared. Preferably, the transmission line is reconnected to the first VSC in response to determining that the voltage unbalance is cleared and/or the earth fault is cleared. Providing the transmission line with DC circuit breakers allows to disconnect a terminal feeding current into the fault before the second arresters are connected. In particular, this is advantageous in a multi-terminal HVDC grid comprising converters interconnected with multiple other converters. It will also be appreciated that a second pair of DC circuit breakers may be utilized, which second pair of DC circuit breakers is arranged for disconnecting, in response to determining that a voltage unbalance exists, the transmission line from the second VSC and reconnecting, in response to determining that the voltage unbalance is cleared and/or the earth fault is cleared, the transmission line to the second VSC.

Even though advantages of the present invention have in some cases been described with reference to embodiments of the voltage balancing unit according to the first aspect of the invention, corresponding reasoning applies to embodiments of the method according to the second aspect of the invention.

It will also be appreciated that embodiments of the invention for HVDC grids comprising more than two terminals, converters, or VSCs, and a plurality of transmission lines interconnecting the terminals, may be envisaged. In such a multi-terminal grid, each VSC may be provided with AC circuit breakers for disconnecting a VSC from its respective AC network. Further, each transmission line may comprise DC circuit breakers at either end, such that a faulty transmission line may be isolated from either terminal by tripping the DC circuit breakers of that line.

Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

Figure 1:
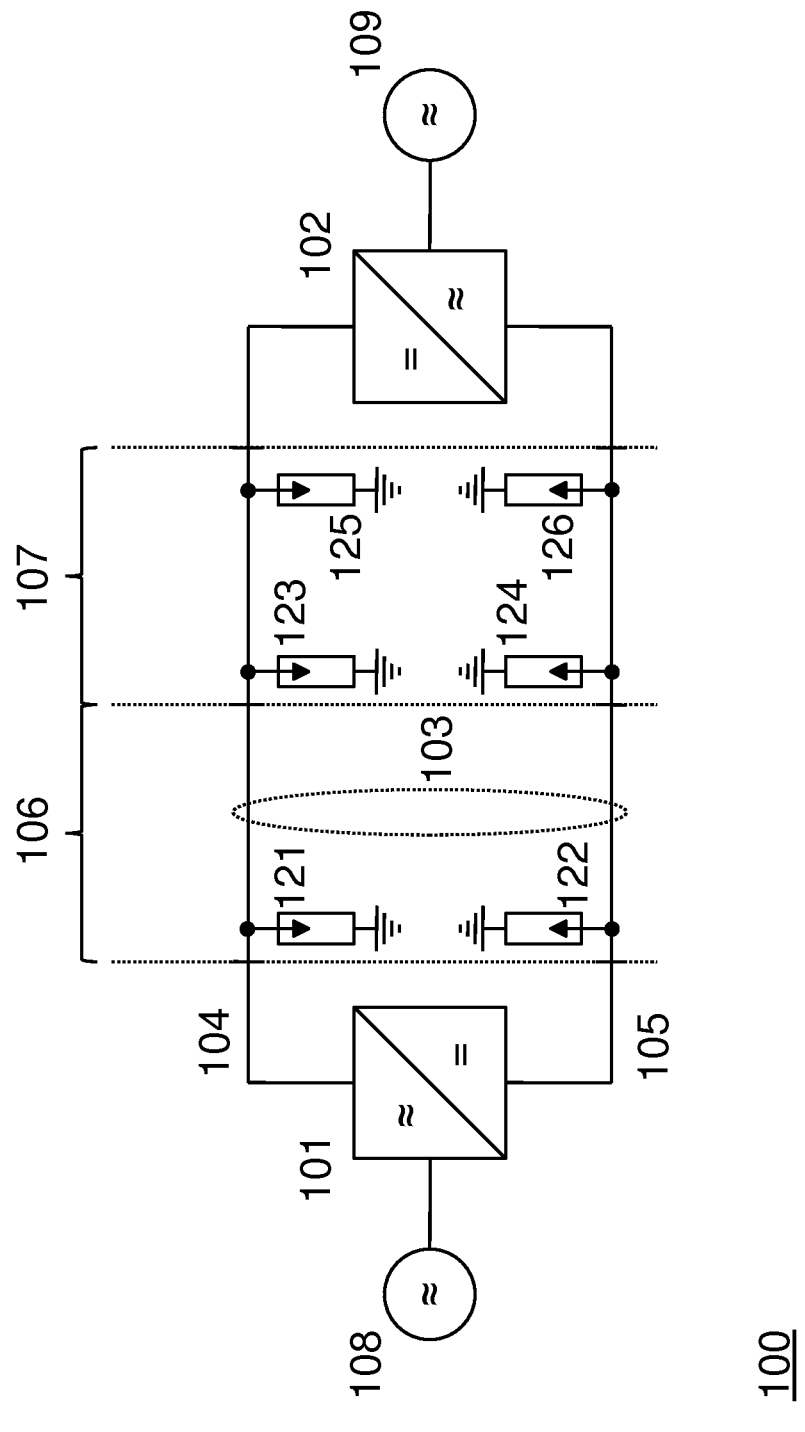
FIG. 1 shows a symmetric monopole HVDC power transmission system.

For the purpose of describing the present invention, a symmetric monopole HVDC power transmission system is sketched in FIG. 1. The system may be part of a larger HVDC power transmission, or distribution, system, such as a multi-terminal HVDC grid.

The power transmission system 100 comprises two AC-DC converters 101 and 102 interconnected by a symmetric monopole transmission line 103 comprising two poles, i.e., conductors, 104 and 105. The transmission line 103 may be based on cables, overhead lines, or a combination thereof. In general, transmission line 103 may comprise multiple sections 106 and 107, each section being based either on cables or overhead lines. Further, the power transmission system 100 comprises three pairs of first arresters 121-126. The first pair of first arresters 121 and 122 is arranged at the first end of transmission line 103, the second pair of first arresters 125 and 126 is arranged at the second end of transmission line 103, and the third pair of first arresters 123 and 124 is arranged at the junction of transmission line sections 106 and 107. Typically, the third pair of first arresters 123 and 124 is employed if one of the sections 106 and 107 is an overhead line and the other section is a cable line. The purpose of arresters 121-126 is to protect the cable from overvoltage due to reflection at the cable ends, i.e., the ends of poles 104 and 105 of transmission line 103. The SIPL of the first arresters 121-126 is about 1.8 p.u. The power transmission system 100 may, e.g., be used for transmitting power from a first AC network 108 to a second AC network 109, or vice versa.

Figure 2:
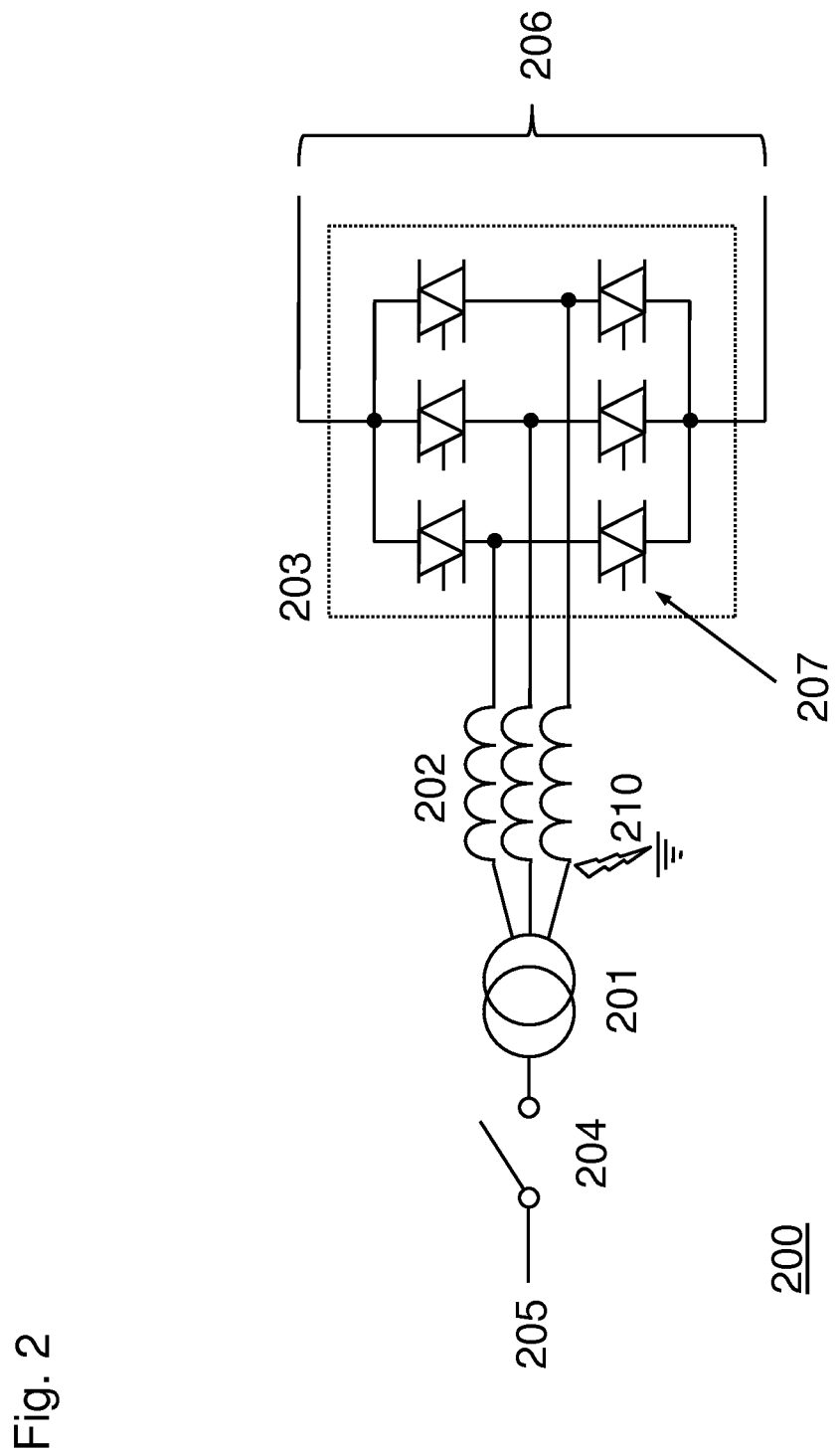
FIG. 2 shows an AC-DC converter.

In FIG. 2, an AC-DC converter, such as converters 101 and 102 described with reference to FIG. 1, is exemplified.

AC-DC converter 200 comprises a transformer 201, line filters or smoothing devices, e.g., reactors 202, and a VSC 203. The converter 200 may further comprise an AC circuit breaker 204. The VSC 203 comprises three valve pairs, one for each AC phase. Each valve 207 comprises several series-connected diode-insulated gate bipolar transistor (IGBT) pairs, the diode and the transistor of each pair being connected anti-parallel with respect to each other. At 205 an AC network may be connected, and an HVDC transmission line, such as transmission line 103 described with reference to FIG. 1, may be connected at 206.

Figure 3:
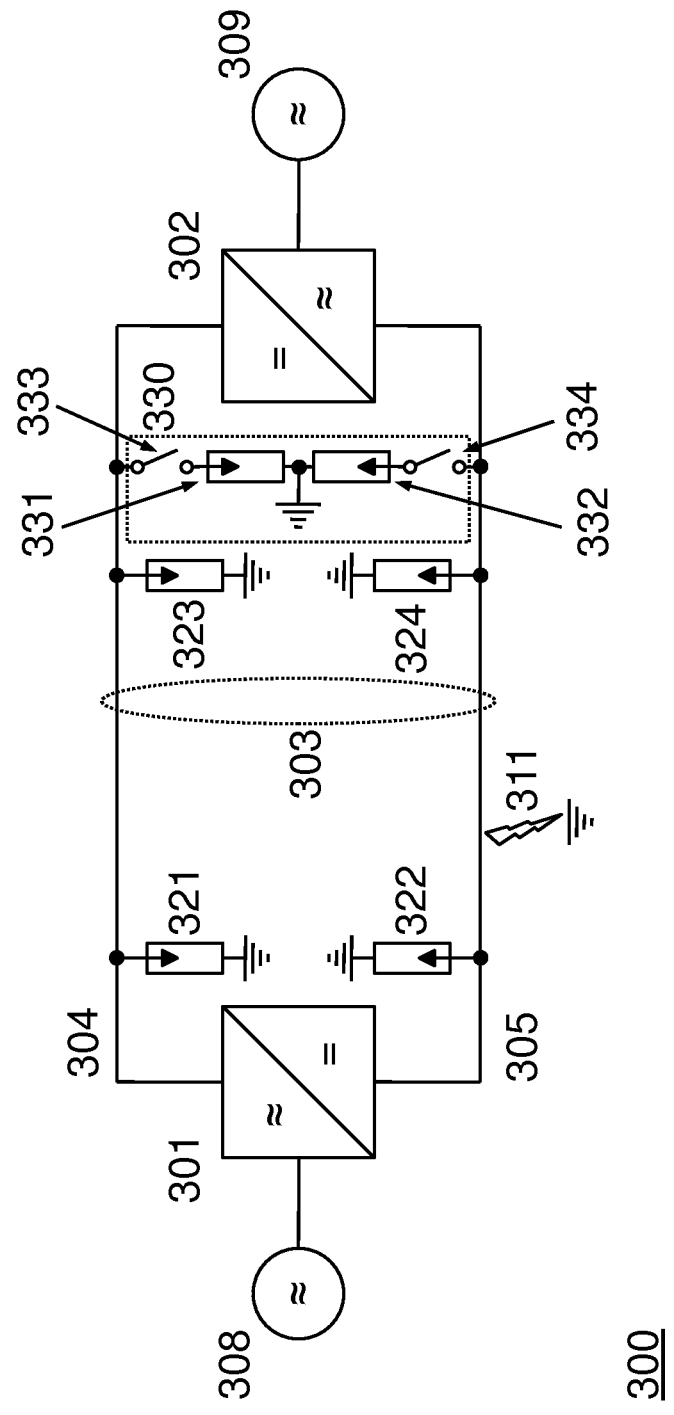
FIG. 3 shows an HVDC power transmission system, in accordance with an embodiment of the invention.

With reference to FIG. 3, an embodiment of the invention is described. In FIG. 3, an HVDC power transmission system 300 is illustrated. System 300 is similar to HVDC power transmission system 100, described with reference to FIG. 1, and comprises two AC-DC converters 301 and 302, which may be connected to AC networks 308 and 309, respectively, and a transmission line 303 interconnecting the two converters 301 and 302. Transmission line 303 comprises two poles 304 and 305. For the sake of simplicity, transmission line 303 comprises only one section, contrary to transmission line 103 illustrated in FIG. 1, and is solely based on an overhead line. System 300 comprises two pairs of first arresters 321-324 being arranged at either end of transmission line 303. Power transmission system 300 further comprises a voltage balancing unit 330. Voltage balancing unit 330 comprises two second arresters 331 and 332, and two switching means 333 and 334. Arrester 331 and switching means 333 are connected in series, and switching means 333 is arranged for connecting arrester 331 between the first pole 304 of transmission line 303 and ground, under the condition that switching means 333 is in a closed state. Correspondingly, arrester 332 and switching means 334 are connected in series, and switching means 334 is arranged for connecting arrester 332 between the second pole 305 of transmission line 303 and ground, under the condition that switching means 334 is in a closed state. During normal operation, switching means 333 and 334 are in an open state.

For the purpose of describing the invention, in particular voltage balancing unit 330, it is assumed that the second pole 305 suffers from a temporary earth fault 311, i.e., a temporary short-circuit between pole 305 and ground. The fault may be induced by lightning. Further, it is assumed that the base pole-to-earth voltage of power transmission system 300 is 1.0 p.u., and that the SIPLs of the first and second arresters are about 1.8 and 1.2 p.u, respectively.

In the course of earth fault 311, the voltage of the healthy pole 304 will rise to about 1.8 p.u., limited by the first arresters 321-324. The current through arresters 321 and 323 is limited by reactors 202, described with reference to FIG. 2, until the fault current is extinguished by disconnecting the AC network feeding the fault. The conductor of the faulty pole 305 is discharged by the fault, and the fault current fed by converter 301 through the healthy pole 304 will be low, since the voltage of healthy pole 304 is limited by arresters 321 and 323. The fault current may be extinguished by opening the AC circuit breaker arranged at converters 301 and/or 302, such as circuit breaker 204 described with reference to FIG. 2. When the AC circuit breakers are open, the switching means 333 and 334 are closed, such that arrester 331 is connected between the first pole 304 and ground, and arrester 332 is connected between the second pole 305 and ground. As a consequence of connecting the second arresters 331 and 332, the voltage of the healthy pole 304 will be reduced to about 1.2 p.u., i.e., close to the base pole-to-earth voltage. The voltage of the faulty pole 305 is not affected when the second arresters 331 and 332 are connected.

When the fault on pole 305 is cleared, i.e., when the temporary short-circuit between pole 305 and ground has passed, the power transmission may be restarted. This may be achieved by closing the AC circuit breakers at converters 301 and 302, resulting in a temporary pole-to-pole voltage of about 1.1-1.2 p.u. Once the VSC has synchronized the valve control, the pole-to-pole voltage is reduced to about 0.95-1.05 p.u. Finally, the restart is completed by opening switching means 333 and 334, thereby disconnecting the second arresters 331 and 332.

Figure 4:
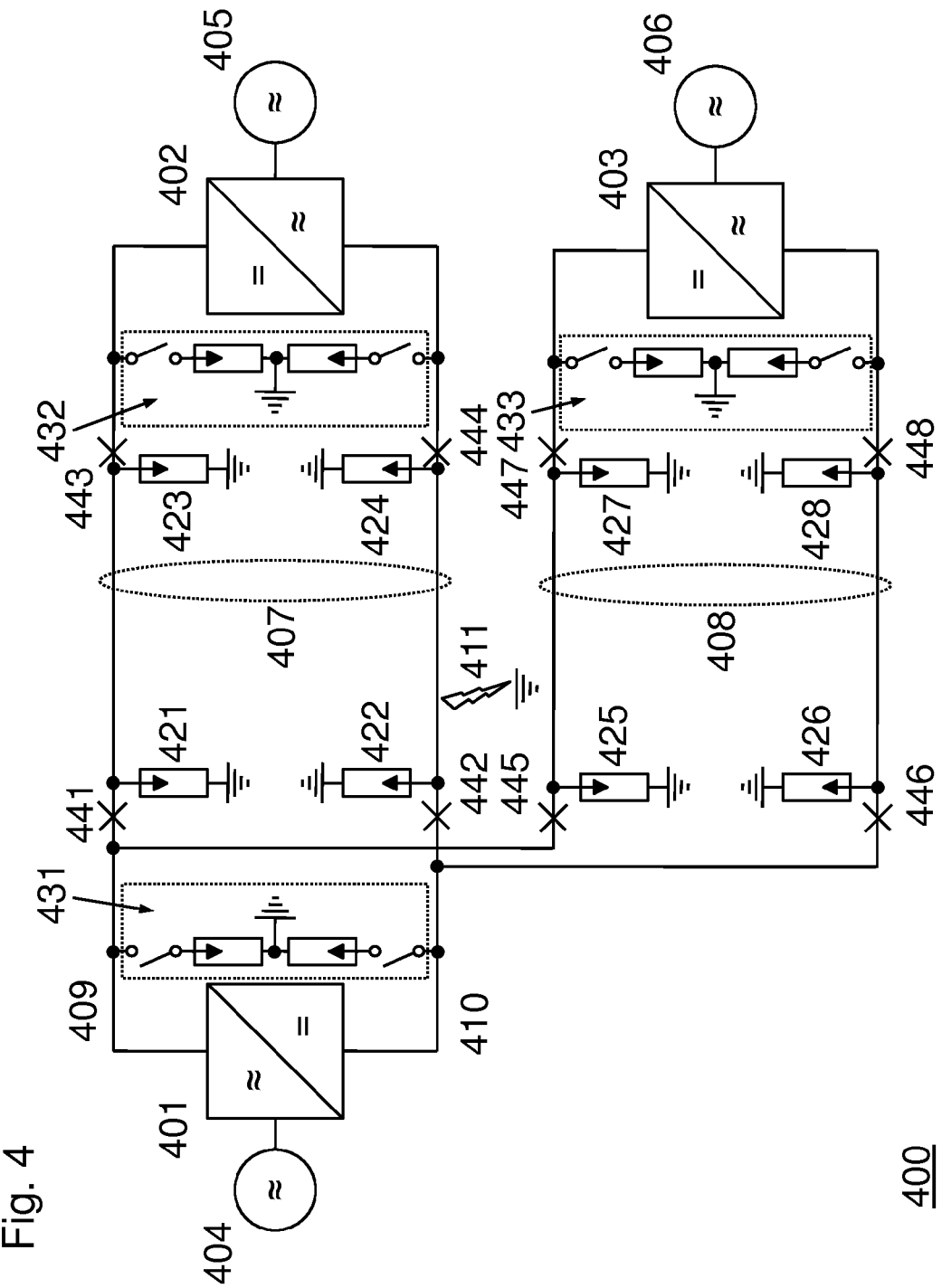
FIG. 4 shows an HVDC power transmission system, in accordance with another embodiment of the invention.

With reference to FIG. 4, another embodiment of the invention is described. FIG. 4 illustrates an HVDC power transmission system 400 comprising three converters 401, 402, and 403, connected to AC networks 404, 405, and 406, respectively, and HVDC transmission lines 407 and 408. Transmission line 407 interconnects converters 401 and 402, whereas transmission line 408 interconnects converters 401 and 403. For the remainder, it is assumed that transmission lines 407 is solely based on an overhead line, whereas transmission line 408 may be based on cables or overhead lines. Each transmission line comprises two poles 409 and 410. The transmission lines 407 and 408 may further comprise DC circuit breakers 441-448, marked as crosses in FIG. 4, for disconnecting a transmission line from its converters, e.g., if a transmission line is to be isolated in the event of a fault on the line. For instance, if transmission line 407 is to be isolated, DC circuit breakers 441-444 are tripped, i.e., opened. Further, each transmission line comprises pairs of first arresters 421-428 at either end. Additional first arresters (not shown in FIG. 4) may be arranged at the converter side DC breakers 441-448, one pair for each converter 401-403. In addition, power transmission system 400 comprises voltage balancing units 431-433, such as voltage balancing unit 330 described with reference to FIG. 3. In order to not obscure the drawing, reference numerals relating to second arresters and switching means comprised in voltage balancing units 431-433 are omitted in FIG. 4.

For the purpose of describing the invention, it is assumed that the base pole-to-earth voltage of power transmission system 400 is 1.0 p.u., and that the SIPLs of the first and second arresters are about 1.8 and 1.2 p.u, respectively.

In the event of a temporary earth fault 411 on the second pole 410 of transmission line 407, the voltage of the first, healthy, pole 409 of transmission line 407 will rise to about 1.8 p.u., limited by the first arresters 421-424. Transmission line 407 may be isolated by opening the DC circuit breakers 441-444. Then, the voltage at converter 402 may be balanced by way of voltage balancing unit 432. Optionally, the voltage at converters 401 and 403, and on transmission line 408, may be balanced utilizing voltage balancing units 431 and 433, respectively. Voltage balancing is achieved by closing the switching means comprised in voltage balancing units 431-433, thereby connecting the second arresters, as was described with reference to FIG. 3. After the fault is cleared, transmission line 407 may be restarted by opening the switching means comprised in voltage balancing units 431-433, thereby disconnecting the second arresters, as was described with reference to FIG. 3, and, subsequently, closing DC circuit breakers 443 and 444, as well as DC circuit breakers 441 and 442.

In the event of an earth fault in converter 403, such as earth fault 210 on one of the three phases between transformer 201 and VSC 203 described with reference to FIG. 2, the voltage of both poles 409 and 410 will rise to about 1.8 p.u., limited by the first arresters 421-428. Converter 403 may be isolated by opening an AC circuit breaker of converter 403, such as AC circuit breaker 204 shown in FIG. 2, as well as DC circuit breakers 447 and 448. After the fault is cleared, the voltage of the transmission lines may be balanced, i.e., reduced to near the normal value, by connecting the second arresters comprised in voltage balancing units 431 and 432, as was described with reference to FIG. 3.

Figure 5:
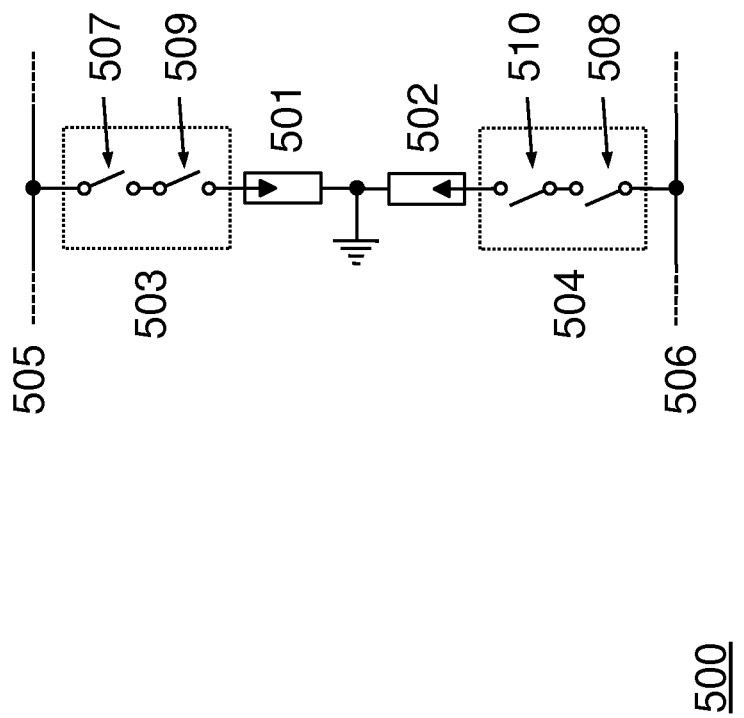
FIG. 5 shows a voltage balancing unit, in accordance with an embodiment of the invention.

In FIG. 5, an embodiment of the voltage balancing unit is shown. Voltage balancing unit 500 is similar to voltage balancing units 330 and 431-433, described with reference to FIGS. 3 and 4, respectively, and comprises two second arresters 501 and 502, as well as switching means 503 and 504 which are arranged for connecting either arresters 501 and 502 between poles 505 and 506, respectively, and ground. Voltage balancing unit 500 may, e.g., be arranged for effecting the connection of arresters 501 and 502 between the poles and ground upon determining that a voltage unbalance between poles 505 and 506 exists. Optionally, the connection may be effected in response to determining that the fault has been disconnected, e.g., by tripping circuit breakers, as was described above.

With reference to FIG. 5, each of the switching means 503 and 504 may comprise HSSs 507 and 508, respectively, and disconnectors 509 and 510, respectively. Since an HSS does not have the capability to interrupt a potential current through arresters 501 or 502, a series connection of an HSS with a disconnector may be employed. HSS 507 is connected in series with disconnector 509 and arrester 501, whereas HSS 508 is connected in series with disconnector 510 and arrester 502. During normal operation, disconnectors 509 and 510 are closed, whereas HSSs 507 and 508 are open. In the event of an earth fault, HSSs 507 and 508 are closed, thereby establishing the connection of arresters 501 and 502 between poles 505 and 506, respectively, and ground. Subsequently, after the fault is cleared, the disconnectors 509 and 510 are opened, thereby disconnecting the arresters 501 and 502. Finally, the HSSs 507 and 508 are opened and the disconnectors 509 and 510 are closed, thereby restoring the condition of voltage balancing unit 500 under normal operation.

An embodiment of the invention with switching means comprising both HSSs and disconnectors is advantageous in that it is less costly than an embodiment employing HVDC circuit breakers. By connecting an HSS and a disconnector in series, the distinct characteristics of HSSs and disconnectors may be exploited. More specifically, in voltage balancing unit 500, described with reference to FIG. 5, the short closing time of HSSs 507 and 508, and the larger current breaking capability of disconnectors 509 and 510, are combined. However, it will be appreciated that a single switching device may be used, such as an HVDC circuit breaker, instead of combining HSSs and disconnectors as is illustrated in FIG. 5. For instance, switching means 503 and 504 may be HVDC circuit breakers with a sufficiently short closing time and a sufficiently large direct current breaking capability. Using switching means with a short closing time is advantageous in that the duration of the disturbance may be minimized. On the other hand, a sufficient direct current breaking capability is required in order to break the direct current through the second arresters when the second arresters are to be disconnected.

The person skilled in the art realizes that the present invention by no means is limited to the embodiments described above. On the contrary, many modifications and variations are possible within the scope of the appended claims.

In conclusion, a voltage balancing unit for a symmetric monopole HVDC transmission line interconnecting two VSCs, the transmission line comprising first arresters having a first SIPL, is provided. The voltage balancing unit comprises a pair of second arresters having a second SIPL which is less than the first SIPL, and switching means being arranged for temporarily connecting, in the event of a voltage unbalance on the transmission line, the first arresters between either pole and ground. The invention makes use of an understanding that a voltage unbalance on the transmission line may be removed by temporarily connecting second arresters, with a significantly lower SIPL than the first arresters, for limiting the pole voltage to a level close to the normal voltage. Further, a method of voltage balancing is provided. Voltage unbalances may arise as a consequence of lightning induced earth faults.

The invention claimed is:

1. A voltage balancing unit for a symmetric monopole high voltage direct current, HVDC, transmission line being arranged for interconnecting a first voltage source converter, VSC, and a second VSC, the transmission line comprising:
    a first pole and a second pole, and two pairs of first arresters, a first pair being arranged at a first end of the transmission line and a second pair being arranged at a second end of the transmission line, a first arrester of either pair being connected between the first pole and ground and a second arrester of either pair being connected between the second pole and ground, the first arresters having a first switching impulse protective level, SIPL,
    wherein the voltage balancing unit is arranged to perform voltage balancing for a voltage unbalance caused by an earth fault and comprises:
    a pair of second arresters having a second SIPL which is less than the first SIPL, and
    a switching device configured to:
        connect, through being closed after the earth fault has been cleared and in response to determining that the voltage unbalance exists between the first pole and the second pole, a first arrester of the pair of second arresters between the first pole and ground, and a second arrester of the pair of second arresters between the second pole and ground, and
        disconnect, in response to determining that the voltage unbalance is cleared, the second arresters.

2. The voltage balancing unit according to claim 1, wherein the pair of second arresters is arranged at either of the ends of the transmission line.

3. A high voltage direct current, HVDC, power transmission unit comprising:
    a first voltage source converter, VSC, comprising an alternating current, AC, side and a direct current, DC, side, the AC side of the first VSC being connectable to a first AC network,
    a symmetric monopole transmission line being arranged for interconnecting the DC side of the first VSC and a DC side of a second VSC, an AC side of the second VSC being connectable to a second AC network, the transmission line comprising a first pole and a second pole, and
    a voltage balancing unit according to claim 2.

4. The voltage balancing unit according to claim 1, wherein the first SIPL is in the range of 1.8 to 2.0 per unit, p.u., and the second SIPL is in the range of 1.15 to 1.20 p.u.

5. A high voltage direct current, HVDC, power transmission unit comprising:
    a first voltage source converter, VSC, comprising an alternating current, AC, side and a direct current, DC, side, the AC side of the first VSC being connectable to a first AC network,
    a symmetric monopole transmission line being arranged for interconnecting the DC side of the first VSC and a DC side of a second VSC, an AC side of the second VSC being connectable to a second AC network, the transmission line comprising a first pole and a second pole, and
    a voltage balancing unit according to claim 4.

6. The voltage balancing unit according to claim 1, wherein the switching device comprises:
    a pair of high speed switches, HSSs, a first HSS being connected in series with the first arrester of the pair of second arresters and a second HSS being connected in series with the second arrester of the pair of second arresters, the HSSs being in an open state under normal operation, and
    a pair of disconnectors, a first disconnector being connected in series with the first arrester of the pair of second arresters and a second disconnector being connected in series with the second arrester of the pair of second arresters, the disconnectors being in a closed state under normal operation,
    wherein the switching means is further configured to:
        close, in response to determining that a voltage unbalance exists, the HSSs, and
        in response to determining that the voltage unbalance is cleared:
            open the disconnectors,
            open the HSSs, and
            close the disconnectors.

7. A high voltage direct current, HVDC, power transmission unit comprising:
    a first voltage source converter, VSC, comprising an alternating current, AC, side and a direct current, DC, side, the AC side of the first VSC being connectable to a first AC network,
    a symmetric monopole transmission line being arranged for interconnecting the DC side of the first VSC and a DC side of a second VSC, an AC side of the second VSC being connectable to a second AC network, the transmission line comprising a first pole and a second pole, and
    a voltage balancing unit according to claim 6.

8. A high voltage direct current, HVDC, power transmission unit comprising:
    a first voltage source converter, VSC, comprising an alternating current, AC, side and a direct current, DC, side, the AC side of the first VSC being connectable to a first AC network,
    a symmetric monopole transmission line being arranged for interconnecting the DC side of the first VSC and a DC side of a second VSC, an AC side of the second VSC being connectable to a second AC network, the transmission line comprising a first pole and a second pole, and
    a voltage balancing unit according to claim 1.

9. The HVDC power transmission unit according to claim 8, further comprising an AC circuit breaker being arranged for:
    disconnecting, in response to determining that a voltage unbalance exists, the first VSC from the first AC network, and
    reconnecting, in response to determining that the voltage unbalance is cleared, the first VSC to the first AC network.

10. The HVDC power transmission unit according to claim 8, further comprising a pair of DC circuit breakers being arranged for:
    disconnecting, in response to determining that a voltage unbalance exists, the transmission line from the first VSC, and
    reconnecting, in response to determining that the voltage unbalance is cleared, the transmission line to the first VSC.

11. A method of voltage balancing in a symmetric monopole high voltage direct current, HVDC, transmission line being arranged for interconnecting a first voltage source converter, VSC, and a second VSC, the transmission line comprising:
- a first pole and a second pole, and two pairs of first arresters, a first pair being arranged at a first end of the transmission line and a second pair being arranged at a second end of the transmission line, a first arrester of either pair being connected between the first pole and ground and a second arrester of either pair being connected between the second pole and ground, the first arresters having a first switching impulse protective level, SIPL,
- the method being performed for a voltage unbalance caused by an earth fault and comprising the steps of:
  - providing a pair of second arresters having a second SIPL which is less than the first SIPL,
  - connecting, through being closed after the earth fault has been cleared and in response to determining that the voltage unbalance exists between the first pole and the second pole, a first arrester of the pair of second arresters between the first pole and ground, and a second arrester of the pair of second arresters between the second pole and ground, and
  - disconnecting, in response to determining that the voltage unbalance is cleared, the second arresters.

12. The method according to claim 11, wherein the pair of second arresters is connected at either of the ends of the transmission line.

13. The method according to claim 11, wherein the first SIPL is in the range of 1.8 to 2.0 per unit, p.u., and the second SIPL is in the range of 1.15 to 1.20 p.u.

14. The method according to claim 11, further comprising: providing a pair of high speed switches, HSSs, a first HSS being connected in series with the first arrester of the pair of second arresters and a second HSS being connected in series with the second arrester of the pair of second arresters, the HSSs being in an open state under normal operation, and providing a pair of disconnectors, a first disconnector being connected in series with the first arrester of the pair of second arresters and a second disconnector being connected in series with the second arrester of the pair of second arresters, the disconnectors being in a closed state under normal operation, wherein the step of connecting the second arresters comprises:
- closing the HSSs, and wherein the step of disconnecting the second arresters comprises:
- opening the disconnectors,
- opening the HSSs, and
- closing the disconnectors.

15. The method according to claim 11, wherein the first VSC is connectable to a first AC network, the method further comprising the steps of:
- disconnecting, in response to determining that a voltage unbalance exists, the first VSC from the first AC network, and
- reconnecting, in response to determining that the voltage unbalance is cleared, the first VSC to the first AC network.

16. The method according to claim 11, further comprising the steps of: disconnecting, in response to determining that a voltage unbalance exists, the transmission line from the first VSC, and
- reconnecting, in response to determining that the voltage unbalance is cleared, the transmission line to the first VSC.

* * * * *